Figure 1:
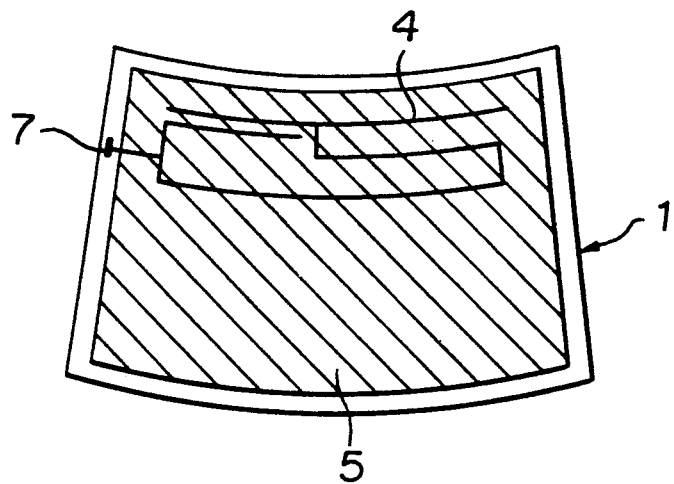

United States Patent [19]

Shibata et al.

[11] Patent Number: 5,132,161
[45] Date of Patent: Jul. 21, 1992

[54] WINDOW GLASS FOR AUTOMOBILE WITH A HEAT REFLECTIVE LAYER AND AN ANTENNA CONDUCTOR

[75] Inventors: Shinya Shibata, Aiko; Eiichi Ando; Akira Hirano, both of Yokohama, all of Japan

[73] Assignee: Asahi Glass Company Ltd., Tokyo, Japan

[21] Appl. No.: 641,805

[22] Filed: Jan. 16, 1991

Related U.S. Application Data

[63] Continuation of Ser. No. 400,942, Aug. 31, 1989, abandoned.

[30] Foreign Application Priority Data

Sep. 1, 1988 [JP] Japan ............................ 63-115458[U]

[51] Int. Cl.$^5$ ............................ H01Q 1/32; H01Q 1/38
[52] U.S. Cl. ............................ 428/192; 428/201;
428/204; 428/203; 428/472; 428/432; 428/698;
428/702; 428/699; 428/913; 428/207; 428/212;
428/427; 428/428; 428/689; 428/697; 428/701;
428/704; 428/918; 343/711; 343/712; 343/704;
359/359
[58] Field of Search ............................ 343/711, 712, 704;
350/276 R, 276 SL, 164, 1.6; 428/201, 204, 203,
192, 472, 432, 698, 702, 699, 913, 207, 212, 427,
428, 689, 697, 701, 704, 918

[56] References Cited

U.S. PATENT DOCUMENTS

| | | | |
|---|---|---|---|
| 4,265,974 | 5/1981 | Gordon | 428/457 X |
| 4,320,169 | 3/1982 | Yatabe et al. | 428/336 X |
| 4,507,547 | 3/1985 | Taga et al. | 350/1.6 X |
| 4,583,815 | 4/1986 | Taga et al. | 350/1.6 |
| 4,628,005 | 12/1986 | Ito et al. | 428/698 X |
| 4,684,575 | 8/1987 | Beale | 428/698 X |
| 4,721,964 | 1/1988 | Sato et al. | 343/712 X |
| 4,778,731 | 10/1988 | Kraatz et al. | 350/1.6 X |
| 4,794,319 | 12/1988 | Shimazaki | 343/712 X |

FOREIGN PATENT DOCUMENTS

| | | |
|---|---|---|
| 2978130 | 1/1989 | European Pat. Off. . |
| 0244101 | 10/1986 | Japan . |
| 0049702 | 3/1987 | Japan . |
| 0206332 | 8/1988 | Japan . |
| 0242948 | 10/1988 | Japan . |
| 3265846 | 11/1988 | Japan . |
| 0141130 | 1/1989 | Japan . |
| 2126256 | 3/1984 | United Kingdom . |

*Primary Examiner*—Ellis P. Robinson
*Assistant Examiner*—William P. Watkins, III
*Attorney, Agent, or Firm*—Oblon, Spivak, McClelland, Maier & Neustadt

[57] ABSTRACT

A window glass has a heat ray reflective layer including metal nitrides as a component thereof and an antenna conductor for an automobile wherein the heat ray reflective layer has a surface resistance of at least 20 k$\Omega$/sq. for preventing interference with the antenna operation.

11 Claims, 3 Drawing Sheets

WINDOW GLASS FOR AUTOMOBILE WITH A HEAT REFLECTIVE LAYER AND AN ANTENNA CONDUCTOR

This application is a continuation of application Ser. No. 07/400,942, filed on Aug. 31, 1989, now abandoned.

The present invention relates to a window glass for an automobile. More particularly, it relates to a window glass for an automobile in which a function of reflecting heat rays and a function of antenna are provided on or in the surface of the window glass.

Recently, there is a tendency that various types of radiowave transmitting/receiving apparatuses such as radiowave receiving units for AM broadcasts and/or FM broadcasts, television receiving units, wireless telephones or the like are mounted on automobiles. For this purpose, a window glass antenna wherein an antenna or antennas for a single or a plurality of radiowave receiving or transmitting units are formed in or on the surface of a window glass has been used. As an antenna conductor for the window glass antenna, a print antenna conductor wherein silver paste is printed on the surface of a glass sheet in a predetermined pattern, followed by baking it, a wire antenna conductor wherein thin conductive metal wires such as copper wire are arranged on a window glass, or a film-like antenna conductor wherein a transparent conductive layer is formed on a window glass are widely used.

On the other hand, recently, there is a tendency that a window glass having a large surface area is used for an automobile. This causes such disadvantage that when heat rays (infrared rays) such as direct rays of sun enter in the cabin of an automobile through the windows, there causes temperature rise in the cabin. In order to minimize the disadvantage, a technique of controlling an amount of heat rays entering in the cabin by applying a thin metal layer having high heat ray reflective properties (such thin metal layer being made of Ag series, Pt series, Al series or Cr series metal) as a heat ray reflective layer on a window glass, has been proposed and partly employed. The thin metal layer has high reflectivity to visible light, hence it decreases transmissivity to the visible light and brings about glaring. Accordingly, an anti-reflective layer is coated on the window glass in practical use. For instance, use is made in such a manner that the thin metal layer is sandwitched by metal oxide layers such as $ZnO$, $SnO_2$, $TiO_2$, $Bi_2O_3$ or the like so that the reflectivity of the thin metal layer is reduced by utilizing interference of light, and the durability is improved.

When a thin metal layer of, for instance, an Ag series metal is used for a heat ray reflective layer, it shows high electromagnetic shielding properties since the metal itself is conductive wherein the surface resistance is about several $\Omega/sq.$-$10\Omega/sq.$ On the other hand, radiowaves transmitted from or received by the window glass antenna are electromagnetic waves. Accordingly, when the heat ray reflective layer of such thin metal layer is formed in the vicinity of the window glass antenna, radiowaves to be received by the glass antenna are interrupted by the heat ray reflective layer having high electromagnetic shielding properties. Since this causes reduction in gain characteristics at the time of receiving the radiowaves, a necessary and sufficient gain can not be obtained.

It is an object of the present invention to provide a window glass for an automobile which provides a high gain of antenna.

In accordance with the present invention, there is provided a window glass with a heat ray reflective layer and an antenna conductor for an automobile wherein the heat ray reflective layer has a surface resistance of at least 20 k$\Omega$/sq.

In one preferred embodiment, the above-mentioned heat ray reflective layer is provided at the outer side of the automobile with respect to the antenna conductor, as shown in FIGS. 4 to 7.

In another preferred embodiment, the heat ray reflective layer is provided at the inner side of the automobile with respect to the antenna conductor, as shown in FIGS. 8 to 11.

Figure 2:
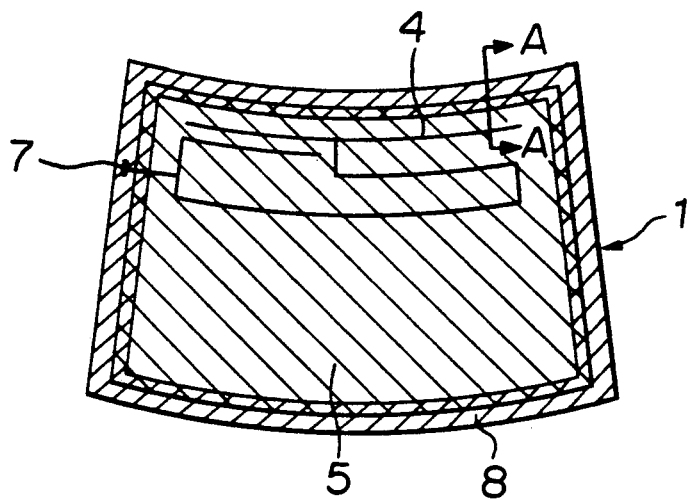
Figure 3:
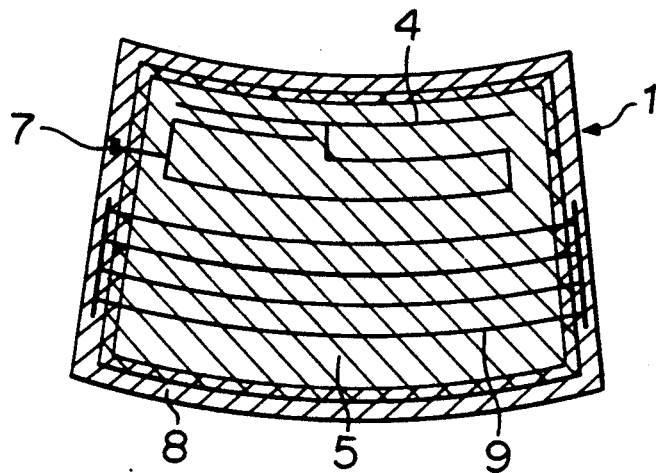

In drawings:

FIGS. 1 to 3 are respectively diagrams showing different embodiments of the window glass with an antenna conductor and a heat ray reflective layer for an automobile; and FIGS. 4 to 11 are respectively enlarged longitudinal cross-sectional views taken long a line A—A in FIG. 2 which show different embodiments of the present invention.

In the following, preferred embodiments of the window glass for an automobile of the present invention will be described with reference to the drawings.

Figure 4:
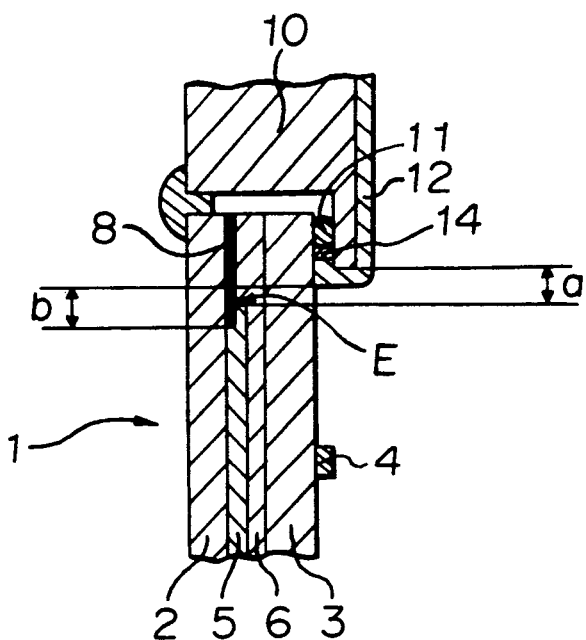

FIG. 1 is a front view of an embodiment of the window glass 1 of the present invention in which a heat ray reflective layer 5 and an antenna conductor 4 are formed in a glass sheet for the rear window of an automobile. The window glass 1 is constituted, for instance, by a laminated glass as shown in FIG. 4. The laminated glass has an inside glass sheet 3 facing the cabin of the automobile wherein an antenna conductor 4 as a print antenna formed by printing conductive silver paste is printed at the upper portion of the inside glass sheet 3, followed by baking it, and an outside glass sheet 2 facing the outside of the automobile wherein a heat ray reflective layer 5 is formed on the entire surface of the inside glass sheet 2 except its circumferential portion. A power feeding point 7 is formed on the window glass 1 so as to be electrically connected to the antenna conductor 4.

For the window glass 1 having the heat ray reflective layer 5 and the antenna conductor 4, a laminated glass of a multi-layered structure in which two or more glass sheets are laminated interposing an interlayer or interlayers 6 of a material such as polyvinyl butyral, a laminated glass wherein a plastic film having anti-tearing properties is bonded to the surface of the glass sheet facing the inside of the cabin, or a single glass sheet may be used.

As to the arrangement of the heat ray reflective layer 5 and the antenna conductor 4, various types of arrangement as illustrated in FIGS. 4 to 11 which are shown by means of enlarged vertical cross-sectional views may be used.

In the present invention, a heat ray reflective film having a surface resistance of at least 20 k$\Omega$/sq. is used as the heat ray reflective layer 5 so that the layer 5 does not interrupt radiowaves to be received by or to be transmitted from the antenna conductor 4. The above-mentioned purpose can be attained without decreasing the function of the antenna conductor 4 by using the heat ray reflective layer 5 having a surface resistance of at least 20 k$\Omega$/sq. when the heat ray reflective layer 5 is in a non-contacting state to the antenna conductor 4 as shown in, for instance, FIGS. 4 to 7. Especially, more preferable result is obtainable when the surface resistance is 50 k$\Omega$/sq. or more.

On the other hand, when the heat ray reflective layer 5 is in a contacting state to the antenna conductor 4 as shown in, for instance, FIGS. 8 to 11, a higher resistance is required in order to avoid that electromagnetic waves to be received by the antenna are diffused and attenuated into the heat ray reflective layer 5 in addition to cancellation of the electromagnetic shielding function. Accordingly, it is preferable that the surface resistance of the heat ray reflective layer 5 is at least 500 k$\Omega$/sq., more preferably, at least 1 M$\Omega$/sq.

Although the frequency of radiowaves to be received or transmitted is different in FM, AM, TV broadcasts and telephones, and the lower limit of the surface resistance of the heat ray reflective layer varies in correspondence to the frequency, it is sufficient to use the above-mentioned values for all purposes.

The heat ray reflective layer 5 used for the present invention is formed by a thin layer having a high resistance in order to cancel electromagnetic shielding properties and to avoid diffusion of electromagnetic waves. For instance, nitrides such as titanium nitride, chromium nitride, zirconium nitride, carbides such as chromium carbide, tantalum carbide, titanium carbide, zirconium carbide, borides such as zirconium boride, absorptive oxides such as titanium oxide, chronium oxides, silicides, or complexes including at least two compounds selected from the group consisting of the above-mentioned compounds can be used for a layer having heat ray reflecting function because the specific resistance is high in comparison with a conventionally used metal such as Ag and a surface resistance of at least 20 k$\Omega$/sq. can be obtained by suitably selecting the thickness of the layer. Particularly, nitrides such as Tin, TiNx, CrN, CrNx and so on are preferably used since they have excellent heat ray reflecting function and they show a surface resistance of at least 20 k$\Omega$/sq. as well as a sufficient heat ray reflecting function when they are formed in a thin layer which does not cause reduction in visible light transmissivity Tv. Especially, the optimum result can be obtained when the heat ray reflective layer is used in a non-contacting state to the antenna conductor.

The heat ray reflecting function of oxinitrides, carbonitrides, oxicarbides, boronitrides, siliconitrides such as CrNxOy, TiNxOy, TiNxCy, TiOxCy CrNxBy, CrNxSiy is somewhat poor in comparison with that of the nitrides. However, they have a high specific resistance and it is easily to obtain a surface resistance of at least 500 k$\Omega$/sq. Accordingly, the optimum result can be obtained when they are used for the heat ray reflective layer which is in contact with the antenna conductor. Since they have small visible ray absorbing properties, sufficient heat ray reflecting function can be obtained while a high visible transmissivity can be maintained by increasing the thickness of layer. The above-mentioned materials have a high specific resistance by which a surface resistance of at least 500 k$\Omega$/sq. is obtainable even by increasing the thickness of layer.

The heat ray reflective layer 5 used in the present invention may be a single layer unit of the above-mentioned layer having heat ray reflecting function, or a heat ray reflective layer comprising at least two layers wherein the above-mentioned layer having heat ray reflecting function and an undercoat layer of a metal oxide dielectric substance such as TiO$_2$ or SiO$_2$ which improves close-contact properties to glass are laminated, or a heat ray reflective layer comprising at least two layers wherein a protective layer is formed on the above-mentioned layer having heat ray reflecting function in order to increase the durability (this heat ray reflective layer comprising a protective layer is especially preferable when formed on the surface of a window glass which faces the interior of the cabin of an automobile), or a heat ray reflective layer comprising at least two layers wherein the above-mentioned layer having heat ray reflecting function is combined with a layer of metal oxide dielectric substance having relatively high refractive index so that a predetermined optical characteristics can be obtained by utilizing interference of light (e.g. glass/Ta$_2$O$_5$/CrNxOy/Ta$_2$O$_5$, glass/ZnO/TixNOy/ZnO, or glass/TiO$_2$/TiN/TiO$_2$).

In a case of a heat ray reflective layer having a multi-layered structure, it is sufficient that the surface resistance is at least 20 k$\Omega$/sq. as a whole when in non-contacting state with an antenna conductor, or at least 500 k$\Omega$/sq as a whole when the heat ray reflective layer is in a contact state to an antenna conductor. When a protective layer or an undercoat layer other than a layer having heat ray reflecting function is of a dielectric substance and has no electric conductivity, the surface resistance of the layer having heat ray reflecting function substantially determines the surface resistance of the multi-layered heat ray reflective layer. When the undercoat layer is made of an insulating material and the thickness of the undercoat layer is thin as less than about several tens $\mu$m, the layer having heat ray reflecting function effects as if it is in direct-contact with the antenna conductor 4. Accordingly, it is preferable that the heat ray reflective layer of a multi-layered structure including an undercoat layer and a layer having heat ray reflecting function has a surface resistance of at least 500 k$\Omega$/sq., especially, at least 1 M$\Omega$/sq.

As the protective layer which is formed on the heat ray reflection functioning layer and which is exposed at the inside of an automobile in order to increase the durability of the above-mentioned heat ray reflection functioning layer, an amorphous layer of tantalum oxide (Ta$_2$O$_5$) or an amorphous layer of an oxide comprising at least one selected from the group consisting of Zr, Ti, Hf, Sn, Ta and In (these elements are abbreviated as M) and at least one selected from the group consisting of B and Si is preferably used. It is because the above-mentioned layer is amorphous, has a smooth surface and strong resistance to scratching and is chemically stable. When MBxOy, MSizOy or MbxSizOy contains at least 0.05 of B or Si or the both of them to an atom of M, an amorphous layer is formed. When an amount of B or Si is too much, the durability to chemicals, i.e. acid resistance, alkali resistance, humidity resistance and so on tend to decrease. Accordingly, the atomic ratio x of B to M, the atomic ratio Z of Si to M and the atomic ratio of O to M in the layer should respectively be $0.05 \leq x \leq 3$, $2 < y \leq 6.5$ in MBxOy, $0.05 \leq z < 19$, $2.1 \leq y < 40$ in MSizOy, $0.05 \leq x+z$, $z < 19$ in MBxSizOy and $2 < y < 40$ (where $x > 3$, $x \leq 0.25z + 3$). In these layers, when the percentage composition of B or Si increases, the refractive index is decreases. Accordingly, high flexibility in optical design of the heat ray reflective layer is obtainable by suitably changing the percentage composition.

In a case as shown in FIGS. 4 to 7 and 11 wherein the heat ray reflective layer 5 is formed in contact with the interlayer 6, due to aging effect, the bonding force between the glass sheet 2 or 3 and the interlayer 6 may become needlessly large, whereby there may cause reduction in the penetration resistance of a laminated glass, or reduction in the bonding strength or a change of the transmissivity of the heat ray reflection functioning layer may occur due to the aging effect. In such case, it is preferable that the heat ray reflective layer 5 is comprising at least a heat ray reflection functioning layer, and an interposing layer interposed between the heat ray reflection functioning layer and the interlayer 6.

The antenna conductor 4 may be a printed antenna which is formed by printing silver paste on a glass sheet constituting the window glass 1, followed by baking it as shown in, for instance, FIGS. 4, 5 and 8 to 11. Or, an antenna formed by wiring a conductive metallic thin wire such as a copper wire (FIG. 6) or a film-like antenna formed by a transparent conductive film (FIG. 7) may be used. In any of the above-mentioned antennas, a suitable pattern of antenna can be selected on the basis of a desired specification and gain.

In the present invention, it is preferable that the heat ray reflective layer 5 is formed on or in the window except at least its peripheral portion. It is because when the heat ray reflective layer is formed in the entire region including the peripheral portion of the window glass, the electrostatic capacity between the heat ray reflective layer 5 and the automobile body increases to thereby increase shielding effect, whereby antenna gain in the middle wavelength region is greatly reduced. The width of the peripheral portion where there is no heat ray reflective layer 5, i.e. the distance a from the edge of the automobile body 10 at an window portion to the edge E of the heat ray reflective layer 5 is preferably at most 5 mm as shown in FIGS. 4 and 8.

Figure 8:
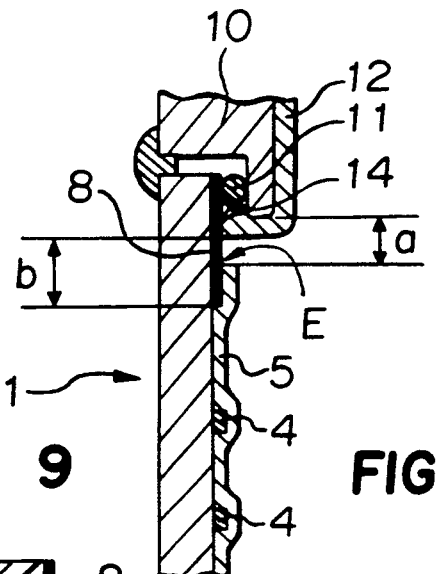

FIGS. 4 and 8 show a window glass for an automobile according to the present invention attached to the automobile body 10 with adhesive 11. Dam rubber 14 is used so as to dam up the adhesive 11.

Figure 9:
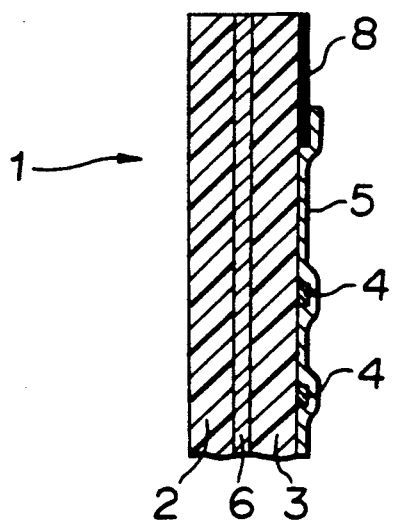
Figure 10:
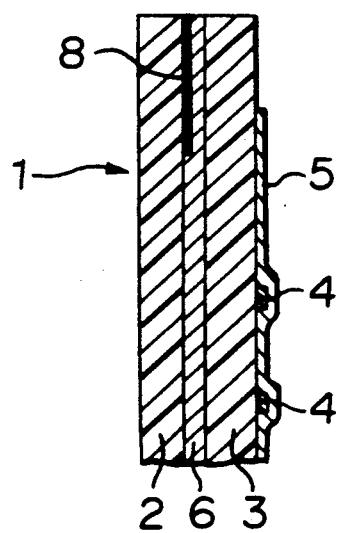

In a case that the antenna conductors 4 are formed on the surface of the window glass facing the cabin and the heat ray reflective layer 5 is formed covering the antenna conductors 4 in the entire area of the window glass except its peripheral portion as shown in FIGS. 8 to 10, the antenna conductors 4 may be so arranged that a part of the antenna conductors 4 extend to an area where the heat ray reflective layer 5 is not formed and a power feeding point 7 is attached at the exposing portion so as to form an antenna terminal to the antenna conductors 4 in the same manner as in FIGS. 1 to 3. Thus, a window glass having excellent outer appearance can be provided.

In the present invention, it is desirable that an insulating, light shielding colored layer 8 is formed at the circumferential portion of the window glass as shown in FIGS. 2 to 11. The light-shielding colored layer 8 can hide the power feeding point 7 for the antenna conductor 4 and the edge E of the heat ray reflective layer 5 at the rear side of the colored layer 8, whereby the outer appearance in view from the outside of the automobile becomes excellent.

It is preferable for the light-shielding colored layer 8 to use ceramic color ink which comprises a pigment for developing a desired color, a low melting point glass frit, a filler of refractory material having good conducting properties to a glass sheet and facilitating the formation of a coating layer and a solvent for screen-printing.

However, the materials for the colored layer are not limited to the above-mentioned.

The light-shielding colored layer 8 is preferably so formed as shown in FIGS. 4 and 8 that the distance b between the inner edge portion of a garnish 12 attached at the circumferential portion of the window glass 1 and the inner edge portion, which is near the center of the window glass, of the light-shielding colored layer 8 is at most 10 mm.

A deffoger print 9 may be provided on or in the window glass to melt snow and to eliminate fogging by heating as shown in FIG. 3.

Figure 5:
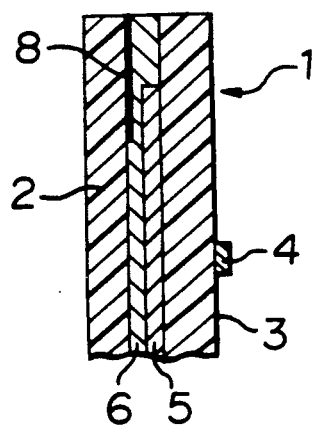
Figure 6:
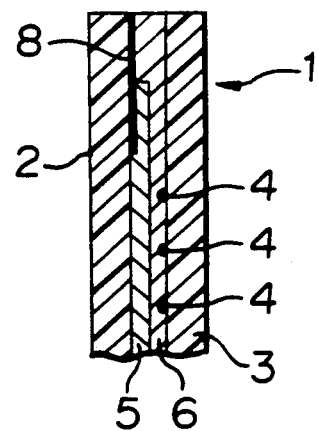
Figure 7:
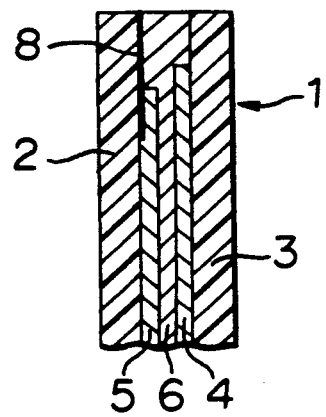

FIGS. 5 to 7 show an embodiment of the window glass for an automobile of the present invention wherein a laminated glass is used. In FIG. 5, the heat ray reflective layer 5 is formed at the contacting surface to an interlayer of a an inner glass sheet 3 facing the interior of the cabin in the laminated glass for the rear window of an automobile. An antenna conductor 4 is formed by a printing method on the surface of the inner glass sheet 3 facing the interior of the cabin. The inner glass sheet 3 is bonded to an outer glass sheet 2 by interposing an interlayer 6 of a plastic material such as polyvinyl butyral.

FIG. 6 shows another embodiment of the window glass of the present invention. The heat ray reflective layer 5 is formed on the contacting surface of the outer glass sheet 2, the antenna conductors 4 of linear antennas are formed at the contacting surface of the inner glass sheet 3, and the outer and inner glass sheets 2, 3 are bonded to each other by interposing the interlayer 6 of a plastic material.

FIG. 7 shows an embodiment of the window glass of the present invention. The heat ray reflective layer 5 is formed on the contacting surface of the outer glass sheet 2, the antenna conductor 4 of a film-like antenna is formed on the contacting surface of the inner glass sheet 3, and the outer and inner glass sheets 2, 3 are to each other by interposing the interlayer 6 of a plastic material.

Figure 11:
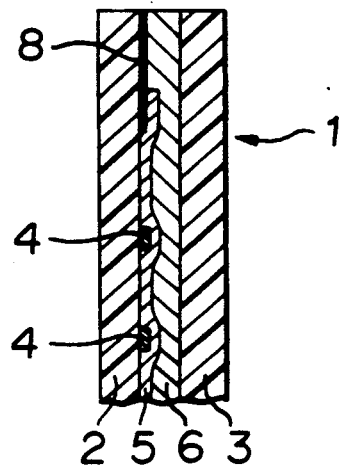

FIG. 11 shows an embodiment of the window glass of the present invention. The antenna conductors 4 of printed antennas and the heat ray reflective layer 5 are respectively formed on the surface facing the interior of the cabin of the outer glass sheet 2, and the inner glass sheet 3 is bonded to the outer glass sheet 2 interposing the interlayer 6 of a plastic material.

In a case that the heat ray reflective layer is formed inside the laminated glass, the heat ray reflective layer is prevented from deteriorating because the layer is not exposed, whereby the window glass having excellent durability can be provided.

As shown in FIG. 9 or 10, the window glass 1 may be so made that the antenna conductors 4 as printed antennas and the heat ray reflective layer 5 are formed on the surface facing the cabin of the inner glass sheet 3, and it is bonded to the outer glass sheet 2 by interposing the interlayer 6 of a plastic material.

In the window glass made of a laminated glass as shown in FIGS. 4 to 7 and 9 to 11, a colored portion or a shading portion which gradually changes tone may be formed at a part of the interlayer 6 of a plastic material, if desired. A plastic film containing a material capable of absorbing or reflecting ultraviolet rays may be used for the interlayer 6 so that the sunburning of a passenger or the discoloration of interior goods of the automobile can be prevented.

FIG. 8 shows an embodiment of the window glass made of a single glass sheet 13 wherein the antenna conductors 4 as printed antennas and the heat reflective layer 5 are formed on the surface facing the cabin of the glass sheet 13. The window glass of a single glass sheet as shown in FIG. 8 provides such advantage that costs of materials and manufacturing are inexpensive and reduces the weight in comparison with a window glass made of a laminated glass.

The positional relationship between the heat layer reflective layer 5 and the antenna conductors 4 formed on the window glass 1 is not limited to the above-mentioned embodiments, and the positions of these elements may be exchanges or any suitable positional relationship may be adopted. It is preferable that the heat ray reflective layer 5 is formed on the surface of a glass sheet facing outside of the automobile because it can effectively prevent the temperature rise of the glass sheet. A large amount of heat outside the automobile can be escaped.

Several Examples of preparing a window glass for an automobile according to the present invention will be described.

A typical method of preparing the window glass 1 as shown in FIG. 8 includes steps of:

(1) forming the light-shielding colored layer 8 at peripheral portion of the glass sheet 13 by screen-printing, followed by drying, (2) screen-printing silver paste to form the antenna conductors 4 and drying them (deffoger strips may be formed by the same printing method at the same time of forming the antenna conductors 4), (3) heating the glass sheet 13 at a temperature more than 600° C. to bend it, and at the same time, baking the light-shielding colored layer and the antenna conductors (after bending operation, a strengthening treatment may be applied by quenching the glass sheet), (4) masking the circumferential portion of the glass sheet 13 by using a masking material such as a metallic frame, a tape or the like, and forming the heat ray reflective layer having a surface resistance of at least 20 kΩ/sq., and (5) removing the masking material.

If the window glass having a curved surface is not required, only the baking operation of the light-shielding colored layer and the antenna conductors formed at the steps (1) and (2) is conducted at step (3). After the step (5), a step of attaching a terminal by soldering or the like may be added.

A typical Example of preparing the laminated window glass 1 as shown in FIG. 9 includes steps of:

(1) and (2) which are the same as those described with reference to the method of preparing the window glass as in FIG. 8, (3)' overlapping the outer glass sheet 2 and the inner glass sheet 3 with the antenna conductors 4 and the light-shielding colored layer 8 formed on the glass sheet 3 in the non-contacting state with the glass sheet 2 and bending the two glass sheets in an overlapping state, (4) and (5) which are the same as those described with reference to FIG. 8, and (6) laminating the inner glass sheet 3 and the outer glass sheet 2 by interposing the interlayer 6 and bonding them.

In the above-mentioned steps, the order of steps (4), (5) and (6) may be changed to the order of (4), (6) and (5).

When the laminated glass as shown in FIG. 7 or 11 is to be prepared, the inner glass plate 3 is put underneath the outer glass sheet 2 with the surface having the antenna conductors 4 and the light-shielding colored layer 8 directing upward and the inner and outer glass sheets are bent in an overlapping state at the above-mentioned step (3)'. Then, after the above-mentioned steps (4) and (5), the inner and outer glass sheets 2, 3 are laminated as shown in FIG. 7 or 11 to perform the laminating operation at the above-mentioned step (6). Thus, it is unnecessary to conduct provisionally baking the light-shielding colored layer 8 and the antenna conductors 4 before the bending operation at the step (3)'. This simplifies manufacturing process.

In a case that the light-shielding colored layer 8 and the antenna conductors 4 are not concentratively formed on the same surface of either one glass sheet as shown in FIGS. 4, 5, 6 and 10, either of the light shielding colored layer 8 and the antenna conductors 4 is formed on the surface laminated with the other glass sheet when the bending operation is carried out. In this case, it is necessary to conduct provisionally baking at about 500° C. before the laminating operation so that the light-shielding colored layer formed by screen-printing is not transferred to the other glass sheet during the bending operation.

In above-mentioned examples, the step (4) of forming the heat ray reflective layer is conducted after the step (3) of bending the glass sheet or sheets. However, the steps of drying at step (2), provisionally baking the light-shielding colored layer 8 and the antenna conductors 4, forming the heat ray reflective layer at step (4), and bending the glass sheets at step (3) may be conducted in this order.

In a case that the heat ray reflective layer 5 is formed on the surface facing the cabin of the inner glass sheet 3 of the laminated glass as shown in FIGS. 9 and 10, the layer may be formed after forming the laminated glass by the steps in the order of (1), (2), (3)', (6), (4) and (5). In accordance with this process, it is unnecessary to put an intervening process of forming the heat ray reflective layer 5 by removing a semi-product from a line of manufacturing wherein a laminated glass is ordinarily prepared through the steps of glass sheet cutting, bending and laminating. This process reduces manufacturing cost.

As above-mentioned, description has been made as to a system that the at least two glass sheets are overlapped, followed by bending. However, it is possible to employ a system that at least two glass sheets are separately bent, followed by laminating.

The heat ray reflective layer 5 may be directly formed on a glass sheet constituting the window glass 1 by a spattering method, a CVD method, a CLD method or another suitable method of forming the layer. Or, the heat ray reflective layer may be formed on a plastic film which is to be bonded on a glass sheet or interposed between glass sheets.

In the construction of the present invention, even in the case that the heat ray reflective layer 5 is formed so as to cover the antenna conductors 4 provided on a surface of the window glass, the heat ray reflective layer 5 itself is having a high electric resistance. Accordingly, there are no electromagnetic shielding properties and it does not impair the gain characteristic of the antenna conductors 4. Accordingly, it effectively functions as a glass antenna for various types of radiowave receiving 1 transmitting unit to be mount on automobiles. Since the surface of the window glass 1 is covered by the heat ray reflective layer 5, temperature rise in the cabin by heat rays such as sun beams can be effectively prevented; saving energy by, for instance, reducing a load for cooling can be performed, and environment of the cabin can be improved.

In order to confirm the effect of the present invention, tests of the window glass of the present invention and a comparative example were conducted, and results as described below were obtained. In accordance with the present invention, it was confirmed that excellent antenna gain characteristic can be obtained in comparison with the comparative example.

In Table 1, Example 1 shows how the function of antenna conductors is reduced at frequencies of 1,000 KHz, 80 MHz, 200 MHz and 400 MHz in a case that a single layer of TiNx (20 k$\Omega$/sq.) is formed as the heat ray reflective layer 5 in the window glass having the construction as shown in FIG. 4 compared with the case wherein no heat ray reflective layer is formed. Example 2 shows data similar to Example 1 in a case that a layer comprising $TiO_2/TiNx/TiO_2$ (20 k$\Omega$/sq.) is formed as the heat ray reflective layer 5 in the window glass having the construction as shown in FIG. 4 compared with the case wherein no heat ray reflective layer is formed. The Comparative Example shows data similar to Example 1 in a case that a layer comprising ZnO/Ag/ZnO (5 $\Omega$/sq.) is formed as the heat ray reflective layer 5 in the window glass having the construction as shown in FIG. 4 compared with the case wherein no heat ray reflective layer is formed. Example 3 shows data similar to Example 1 in a case that a single layer of $CrNxOy$ (1 M$\Omega$/sq.) is formed as the heat ray reflective layer 5 in the window glass having the construction as shown in FIG. 8 compared with the case wherein no heat ray reflective layer is formed.

As is clear from the Table, in accordance with the present invention, the heat ray reflective layer can be formed on or in the window glass without reducing antenna gain characteristics.

As described above, in accordance with the present invention, the heat ray reflective layer formed by a thin film having a high electric resistance cancels electromagnetic shielding properties. Accordingly, reduction in the gain characteristic of the antenna conductor by the influence of the heat ray reflective layer can be prevented, the entering of heat rays in the cabin of an automobile can be prevented, and it performs excellent gain characteristics as a glass antenna.

TABLE 1

| | Layer structure | Frequency | | | |
|---|---|---|---|---|---|
| | | 1000 KHz | 80 MHz | 200 MHz | 400 MHz |
| Example 1 | TiNx single layer | −2 | −1 | −1 | −1 |
| Example 2 | $TiO_2/TiNx/TiO_2$ | −2 | −1 | −1 | −1 |
| Example 3 | CrNxOy | −2 | −1 | −1 | −1 |
| Comparative Example | AnO/Ag/ZnO | −35 | −46 | −48 | −48 |

The thickness of each layer of $TiO_2$ was about 350 Å, and the thickness of each layer of ZnO was about 400 Å.

We claim:

1. A window glass for an automobile with a heat ray reflective layer and an antenna conductor wherein said heat ray reflective layer has a surface resistance in the range of at least 20 k$\Omega$/sq. wherein said heat reflective layer is in a non-contact state to said antenna conductor, wherein said heat reflective layer does not interrupt radio waves to be received by or transmitted from said antenna conductor, and wherein said heat ray reflective layer overlaps the antenna conductor in a direction perpendicular to the plane of the window so as to cover at least a portion thereof.

2. A window glass for an automobile with a heat ray reflective layer and an antenna conductor wherein said heat ray reflective layer has a surface resistance in the range of at least 500 k$\Omega$/sq., wherein said heat reflective layer is in a contact state to said antenna conductor, wherein said heat reflective layer does not interrupt radio waves to be received by or transmitted from said antenna conductor, and wherein said heat ray reflective layer overlaps the antenna conductor in a direction perpendicular to the plane of the window so as to cover at least a portion thereof.

3. The window glass for an automobile according to claim 1 or 2, wherein said heat ray reflective layer is provided at the outer side of the automobile with respect to said antenna conductor.

4. The window glass for an automobile according to claim 1 or 2, wherein said heat ray reflective layer is provided at the inner side of the automobile with respect to said antenna conductor.

5. The window glass for an automobile according to claim 1 or 2, wherein said heat ray reflective layer comprises a layer which is formed of a metal nitride and which functions to reflect heat rays.

6. The window glass for an automobile according to claim 1 or 2, wherein said heat ray reflective layer comprises a layer which is formed of a complex including at least two compounds selected from the group consisting of a nitride, a boride, a carbide, an oxide and a silicide, and which functions to reflect heat rays.

7. The window glass for an automobile according to claim 1 or 2, wherein said heat ray reflective layer is provided on the innermost surface of the window glass facing the inside of the automobile, and said heat ray reflective layer comprises at least a layer which functions to reflect heat rays and a protective layer which is exposed to the air at the inside of the automobile.

8. The window glass for an automobile according to claim 1 to 2, wherein said heat ray reflective layer is formed on the window glass except at a circumferential portion thereof.

9. The window glass for an automobile according to claim 1 or 2, wherein a light-shielding colored layer is formed at the circumferential portion of the window glass.

10. The window glass for an automobile according to claim 1 to 2, wherein said heat ray reflective layer is formed at the entire area of the window glass except a circumferential portion thereof and an edge portion of said heat ray reflective layer is hidden by a light-shielding colored layer when viewed from an outside of the automobile.

11. The window glass for an automobile according to claim 2, wherein the antenna conductor is formed on the surface of the window glass facing inside the automobile and said heat ray reflective layer is formed on the entire surface of the window glass except the circumferential portion thereof to form an exposed portion so that a part of said antenna conductor is exposed at an area where said heat ray reflective layer is not formed, and an antenna power feeding terminal is formed in said exposed portion.

* * * * *